United States Patent
Jadhav et al.

(10) Patent No.: US 9,111,545 B2
(45) Date of Patent: Aug. 18, 2015

(54) HAND-HELD COMMUNICATION AID FOR INDIVIDUALS WITH AUDITORY, SPEECH AND VISUAL IMPAIRMENTS

(75) Inventors: Charudatta Vitthal Jadhav, Mumbai (IN); Bhushan Jagyasi, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 13/698,765

(22) PCT Filed: May 18, 2011

(86) PCT No.: PCT/IN2011/000349
§ 371 (c)(1),
(2), (4) Date: Nov. 19, 2012

(87) PCT Pub. No.: WO2011/145117
PCT Pub. Date: Nov. 24, 2011

(65) Prior Publication Data
US 2013/0079061 A1    Mar. 28, 2013

(30) Foreign Application Priority Data
May 17, 2010   (IN) .......................... 1547/MUM/2010

(51) Int. Cl.
  *H04B 1/38*    (2015.01)
  *H04M 3/42*   (2006.01)
  *G10L 21/06*  (2013.01)
  *H04M 1/725*  (2006.01)
  *G09B 21/04*  (2006.01)

(52) U.S. Cl.
  CPC ................ *G10L 21/06* (2013.01); *G09B 21/04* (2013.01); *H04M 1/72547* (2013.01); *H04M 1/72588* (2013.01); *H04M 2201/60* (2013.01)

(58) Field of Classification Search
  CPC ...... G09B 21/00; G09B 21/009; G09B 21/04; G09B 21/02
  USPC ................................ 455/563, 414.1; 704/271
  See application file for complete search history.

(56) References Cited

U.S. PATENT DOCUMENTS

| 4,925,085 | A | 5/1990 | Buxton |
| 6,240,392 | B1 * | 5/2001 | Butnaru et al. ............... 704/271 |
| 7,027,986 | B2 | 4/2006 | Caldwell et al. |
| 7,607,097 | B2 | 10/2009 | Janakiraman et al. |
| 7,664,531 | B2 | 2/2010 | Kojima et al. |

(Continued)

OTHER PUBLICATIONS

M. Karjalainen, "Review of Speech Synthesis Technology;" Helsinki University of Technology, Department of Electrical and Communications Engineering, Mar. 30, 1999, 104 pp.

(Continued)

*Primary Examiner* — Omoniyi Obayanju
(74) *Attorney, Agent, or Firm* — Ohlandt, Greeley, Ruggiero & Perle, LLP

(57) ABSTRACT

The present invention relates to a hand-held communication aid and method that assists the deaf-dumb and visually impaired individuals to communicate with each other and with normal individuals. The method enables deaf-dumb and visually impaired individuals to communicate with each other and with normal individuals on remote communication means without any hardware improvization. The method enables face to face communication and remote communication aid for deaf-dumb and visually impaired individuals. This method requires no modifications in hand-held communication device used by normal individual.

6 Claims, 10 Drawing Sheets

(56) References Cited

OTHER PUBLICATIONS

T. Evreinova, "Alternative visualization of Textual Information for People with Sensory Impairment;" University of Tampere, 2005, 95 pp.

Z. Ma, et al., "Asynchronous Video Telephony For The Deaf;" University of the Western Cape, Computer Science Department, 6 pp.

International Search Report dated Nov. 25, 2011 corresponding to International Patent Application No. PCT/IN11/00349.

Written Opinion of the International Searching Authority dated Nov. 25, 2011 corresponding to International Patent Application No. PCT/IN11/00349.

* cited by examiner

HAND-HELD COMMUNICATION AID FOR INDIVIDUALS WITH AUDITORY, SPEECH AND VISUAL IMPAIRMENTS

FIELD OF THE INVENTION

The present invention relates to a hand-held communication aid for individuals with auditory, speech and visual impairments. More particularly the present invention relates to a hand-held communication aid and method of communication that assists the individuals with auditory, speech and visual impairments to communicate with normal individuals and with the individuals with auditory, speech and visual impairments.

BACKGROUND OF THE INVENTION AND PRIOR ART

The biggest challenge for a person with physical limitation such as auditory, speech and visual difficulties i.e. deaf-dumb or blind individual is to communicate with individual having similar disabilities and with other normal individuals. Particularly, deaf individuals can't hear the speech communicated to them and dumb individuals are unable to communicate. This gap in communication and associated problems are generally solved by use of sign language, facial expression, lip reading or written communication means, which are typically meant for personal communication with relatively less proximity between the individuals participating in the communication.

Further these means of communication is restricted to either trained individuals who can decipher the presentation of information in such abstract mode of communication. However, the said communication problem is more pronounced in a communication between disabled and normal individual.

Another hindrance for the deaf-dumb individuals is to communicate with the normal individuals without the knowledge of sign language. In such hindrances, they depend on written form of communication. However, for deaf and dumb individuals with reading and writing limitations, written communication is difficult.

Another hindrance for deaf-dumb individuals is to communicate with the visually impaired individual, who cannot read or see the sign language.

The communication between individual in remote places is all the more difficult. Though lots of means for remote communication including mobile phone are available, they are of less use for individuals with visual impairments and speaking difficulties. Generally, deaf-dumb individuals are restricted to use the short message service to communicate through the mobile phones, in which the individual at remote location is also required to type the message. This is time consuming and moreover it requires both the individuals to posses reading and writing capabilities. Hence there is an urgent need to provide such individuals with a means to communicate with similarly disabled individuals and normal individuals.

Some of the inventions which deal to provide communication aid and methods for individuals with hearing and visual impairments:

U.S. Pat. No. 4,596,899 teaches a portable telephone hearing aid having an acousto-acoustic/magnetic amplifier providing a maximum gain of 20 dB has a circular housing at one end of a U-shaped resilient clip member for attaching it to the telephone receiver in a handset. This 'U' shape hearing aid that can be coupled with telephone to provide assistance in hearing for individuals with worn hearing aid and for individuals in noisy environment. Though the '899 patent discloses a method or communication aid for deaf people but fails to disclose a method or communication system for deaf-dumb or speechless individuals to particularly communicate with normal individuals.

U.S. Pat. No. 5,047,952 teaches a communication system for deaf, deaf-blind and non vocal individuals, which includes an instrumented glove for obtaining electrical signals indicative of a hand configuration of a first individual. The elements used to communicate the output includes, voice synthesizer, LED monitor or Braille display. Other components of the invention includes voice recognition, Wrist watch LCD monitor, instrumented gloves for providing inputs by deaf and deaf-blind individuals. A portable keyboard can be used by the normal individual to communicate with the individual with disability. Though the '952 patent discloses communication system for deaf, deaf-blind and non vocal individuals for personal interaction, but it cannot be used or implemented for remote communication specifically via telephone or cell phone.

U.S. Pat. No. 5,524,056 teach a hearing aid comprises and combines an omni-directional and a one directional microphone using a switching circuit, hearing aid amplifier and an equalizer circuit. The switching circuit is proposed to be automatically switching between the microphones depending upon the ambient noise levels. The '056 patent discloses a hearing aid only for the deaf individuals, but fails to disclose a communication aid for deaf-dumb and visually impaired individuals.

U.S. Pat. No. 6,993,474 discloses a compact and portable interactive system for allowing person-to-person communication in a typed language format between individuals experiencing language barriers such as the hearing impaired and language impaired. It discloses a custom laptop specially designed to cater to the individuals with hearing and language difficulties. It includes two keyboards and screens on the either side of laptop. The display screen will further have a split configuration, i.e., a double screen, either top/bottom or left/right depicting chat boxes, each chat box dedicated to a user. The mechanism to translate the language among the many available options before displaying it can be provided with the present invention. Thus one chat box will display text in one language while the other will display in other language. This invention is restricted to face to face communication only. The '474 patent discloses a face to face communication means, but cannot be used or implemented in remote communication as well as for individuals with read-write difficulties.

U.S. Pat. No. 7,027,986 discloses a method and an apparatus for providing automated speech-to-text encoding and decoding for hearing-impaired persons, wherein the broadband subscriber terminal interfaces to: (a) a network to convey speech packets there over, (b) a telephone to convey speech information, and (c) a display device to display textual information of spoken words. Though the '986 patent discloses speech to text encoding and decoding, it restrict use of the equipment for receiving only text or speech inputs. Inputting text requires lot of time and is practically not useful for individuals with speaking difficulties.

U.S. Pat. No. 7,356,473 discloses a computer-aided communication and assistance system that uses a signal processing and other algorithms in a processor in wireless communication with a microphone system to aid a deaf person, wherein an instrumented communication module receives information from one or more microphones and provides textual and, optionally, stimulatory information to the deaf person. The '473 patent use external hardware to convey the speech signals of other person in defined vicinity, which uses speech to text conversion. Such modality is useful for deaf or visually impaired person; however, the said modality may not work in certain severe cases where individual may possess both hearing and visual impairments.

U.S. Pat. No. 7,607,097 discloses a method for incorporating emotional information in a communication stream by receiving an emotional state indicator indicating an emotional state of a presenter in a communication session, retrieving a cultural profile for the presenter, retrieving a plurality of cultural profiles corresponding to each of several recipients in the communication session, for each recipient, translating the emotional state indicator into a corresponding emoticon according to a difference between the cultural profile of the presenter and the cultural profile of each recipient, merging the translated emoticon into a copy of the communication session, and presenting communication session and merged translated emoticon to each recipient. The '097 patent discloses about identifying the emotions from the facial expressions, speech recognition and physical gestures. However, the communication cues originating from these emotions are limited in articulating the actual speech or message; whereas there is a strong requirement for recognition and conversion of a leap movements and hand gestures including sign language into text and further text to speech.

U.S. Pat. No. 7,664,531 discloses an information processing apparatus, which provides communication and exchanging images with a different information processing apparatus, and comprises a storage unit for storing a display pattern dictionary including one or a plurality of finger character images, each finger character image corresponding to a character and/or a numeral and representing a finger character, an operation unit for inputting a character and/or a numeral, an image selecting unit for selecting, from the display pattern dictionary, a finger character image corresponding to the character and/or numeral input by the operation unit, and a transmitting unit for transmitting the selected finger character image to the different information processing apparatus. The '531 patent discloses a communication means for deaf person to communicate with other deaf person over a mobile phone. It primarily converts the signs into codes to be transmitted at remote locations; the input sign language is mapped to a key pad at the caller's mobile. The transmitted information at the receiver mobile again needs to convert the transmitted codes into certain intelligible form, hence requiring modification to be carried out in both the mobile phones participating in the said communication. This particular aspect restricts the universal application of the communication means for disabled individuals. Hence there is an urgent requirement for an universal communication means for disabled individual whereby such disabled individual would able to communicate with rest of the world without bothering about the technology modification required at the other ends.

In the present invention we propose a novel approach with additional functionalities in the existing communication aid to overcome all the above mentioned limitations for individual with hearing and speaking difficulties.

In light of the above mentioned prior arts it is evident that there is a need to have a customizable solution to individuals with physical limitation such as hearing difficulties i.e. deaf and dumb or visually impaired individuals to communicate with each other as well as normal individuals.

In order to address the long felt need of such a solution, the present invention provides hand-held communication aid and method that assists the deaf-dumb and visually impaired individuals to communicate with normal individuals.

OBJECTS OF THE INVENTION

The principle object of the invention is to provide a hand-held communication aid for individuals with hearing, speech and visual impairments.

Further object of the invention is to provide a method to communicate and a communication aid for individuals with hearing, speech and visual impairments.

Another object of the invention is to enable real-time communication for individuals with hearing, speech and visual impairments with each other and with normal individuals.

Yet another object of the invention is to provide communication aid to facilitate individual with hearing as well as read-write difficulties to communicate with other remote or local individuals.

Yet another object of the invention is to provide communication aid without any modification in the existing hardware of the hand-held communication device.

Yet another object of the invention is to provide communication aid without any modification in the existing hand-held communication device used by normal individual while communicating with individual with physical disability.

Yet another object of this invention is to provide real time communication with normal individuals at remote location using individual handheld devices.

Yet another object of this invention is to assist the deaf dumb and normal individuals to communicate in real time at the same location using one common handheld device.

Yet another object of this invention is to provide a facility for training an automatic speech recognition module, so as to personalize the hearing aid with the disabled individual.

SUMMARY OF THE INVENTION

The present invention discloses hand-held communication aid and method that assists individuals with hearing, speech and visual impairments to communicate with each other and with normal individuals.

The user provides input to the remote communication means. The input text provided to the communication means is converted to speech output using the text to speech conversion engine.

The speech output is communicated to the user through the remote communication means. Further, the speech input received by the user is further converted to text or sign or facial expressions using the automated speech recognition engine.

Further, the converted text output is communicated to the user using the display means of the communication aid.

In the principle embodiment of the present invention a system and method is disclosed for facilitating communication of individuals with auditory, speech and visual impairments with normal individuals and individual with auditory, speech and visual impairments, the method of communication comprising the steps of:

feeding a user input into a sender communication means by first user with at least one impairment including visual, auditory and/or speech impairments, the said first user communicating over a communication link with at least one second user with none or at least one impairment including visual, auditory and/or speech impairments having receiver communication means;

training a receiver communication means to create at least one user profile adapted to recognize the user speech encoding;

a sender with one or more impairments selecting at least one input means from the group of keypad, stylus, touch screen, camera and Braille keyboard on a sender communication means;

formalizing selectively an input data format into at least one formalized data format in accordance with the receiving user status, including the user status from the group of one or more impairments of the said user by means of a data formatting option selection means associated with the said sender communication means;

transmitting said formalized data from the sender communication means to at least one remote receiver communication means;

receiving the transmitted data at a receiver communication means;

extracting at least one feature of the received data by means of a data handler adapted to integrate and disintegrate plurality of data elements at the receiver communication means;

invoking at least one user profile trained and stored in a receiver communication means in accordance with the received data format by a personalization means;

formalizing selectively the received data format in accordance with the receiver selection by means of a data formatting option selection means associated with the said receiver communication means; and generating at least one sensible data output in sequential manner by means of data conversion means and intuitively by means of an associated artificial intelligence module in accordance with the data format selection by the receiver.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods disclosed. In the drawings.

DETAILED DESCRIPTION OF THE INVENTION

Figure 1:
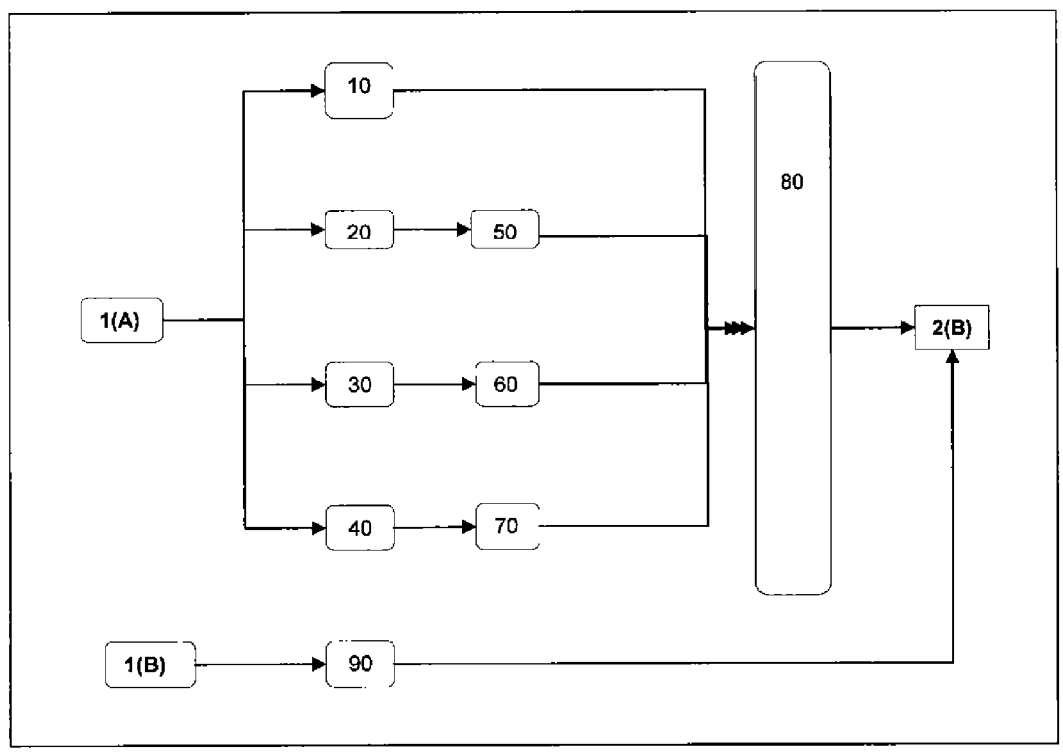
FIG. 1 of the present invention illustrates an integrated communication environment having various functional components communicatively coupled with the communication aids used by the individuals with disabilities for real-time communication.

Before the present method, and hardware enablement are described, it is to be understood that this invention in not limited to the particular methodologies, and hardware's described, as these may vary. It is also to be understood that the terminology used in the description is for the purpose of describing the particular versions or embodiments only, and is not intended to limit the scope of the present invention which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary of the invention, which may be embodied in various forms.

In one of the significant embodiment of the present invention a hand-held communication aid is provided for assisting the deaf-dumb and visually impaired individuals to communicate with each other and with normal individuals. The said hand-held communication aid for facilitating communication of individuals with auditory, speech and visual impairments with normal individuals and individual with auditory, speech and visual impairments, the communication aid comprising:

a communication means facilitating real-time remote communication with other communication devices;

an input means adapted to input a at least one type of message inputs to the said communication means;

a user input fed into the said communication means by first user with at least one impairment including visual, auditory and/or speech impairments, the said first user communicating over a communication link with at least one second user with none or at least one impairment including visual, auditory and/or speech impairments;

a data handler adapted to integrate and disintegrate plurality of data elements during message transmission and reception at the said communication means;

a data format converting means adapted to convert at least one data format into at least one another data format during sending and receiving messages through the said communication means;

an artificial intelligence means adapted to generate at least one complete output in at least one data format consistent with at least one input element to data format converting means;

a user personalization means adapted to identify and create at least one individual caller profile on the said communication means; and an user interface for interactively receiving the messages and acting as a display means.

In a preferred embodiment of the invention the hand-held communication aid can be chosen from any communication device that can be wirelessly connected to the mobile phone, a Personal Digital Assistant (PDA) or any portable communication device, palm-top, mobile digital assistant, and digital wrist watch.

The present invention provides a method for assisting the deaf-dumb and visually impaired individuals to communicate with each other and with normal individuals.

FIG. 1 of the present invention illustrates the functionalities that are required to be integrated with the communication aid used by the individuals with disabilities for real-time communication.

In another embodiment of the invention the software can be either embedded within the hardware or can be as well downloaded from the server.

The user of the present invention can be hearing or visually impaired individuals or normal individual. The user provides input [1(A)] in the form of speech, text, hand written text, facial expressions, sign language, Braille codes and graphics to the remote communication means.

The input means in the said communication means comprises of keypad (10), camera (20), stylus, touch screen (30), Braille keyboard (40) and microphones (90) wherein the input means may be built-in or attached to the communication means.

One of the embodiments of the present invention provides inbuilt dictionary, pictionary and thesaurus for assisting the user and minimizing the delay incurred in typing. Alternatively, a text to speech is expedited by assisting an individual with the choice of word to minimize the keystrokes.

One of the embodiments of the present invention provides data handler engine adapted to integrate and disintegrate plurality of data elements during message transmission and reception at the sender and receiver communication means; wherein the said data handler comprises means of feature extraction, voice extraction and action extraction engine.

One of the embodiments of the present invention provides a data format converting means adapted to convert at least one data format into at least one another data format during sending and receiving messages through the said communication means; wherein the said converting means comprises of speech synthesis engine, natural language processing engine, artificial intelligence means, an image processing engine, a handwriting recognition engine, and a Braille to text conversion engine, an Automatic Speech Recognition engine and a text to Braille converting engine.

One of the embodiments of the present invention provides camera (20) as an input means to capture videos or images as inputs given by the deaf-dumb individual. Particularly, a blind individual may capture either facial expressions or sign language by means of sign recognition engine (50). The sign recognition engine (50) further converts thus captured images of sign language and facial expressions into intelligible text in real-time. The text message is complied by associating each image with their respective meaning stored in the image to text library. The words are combined sequentially in accordance with each frame of the camera. More intelligence can be added in algorithm to form meaningful sentences based on context of the conversation and the signs captured.

One of the embodiments of the present invention provides touch screen (30) as input means for individuals with hearing impairments. These inputs are converted to speech output [2(B)] using the inbuilt handwriting recognition engine or drawing recognition engine (60).

One of the embodiments of the present invention provides Braille keypad interfaced with the communication means (40) as input means for individuals with visual impairments along with hearing impairments. The Braille coded inputs are converted to speech output [2(B)] using the Braille input recognition engine (70). The input text information provided by the individual with disability is converted to speech output [2(B)] by use of text to speech engine (TTS) (80).

The converted/synthesized speech or normal speech input [1(B)] by the normal user received through microphone (90) of the communication means is then transmitted through usual voice call as the speech output [2(B)].

Figure 2:
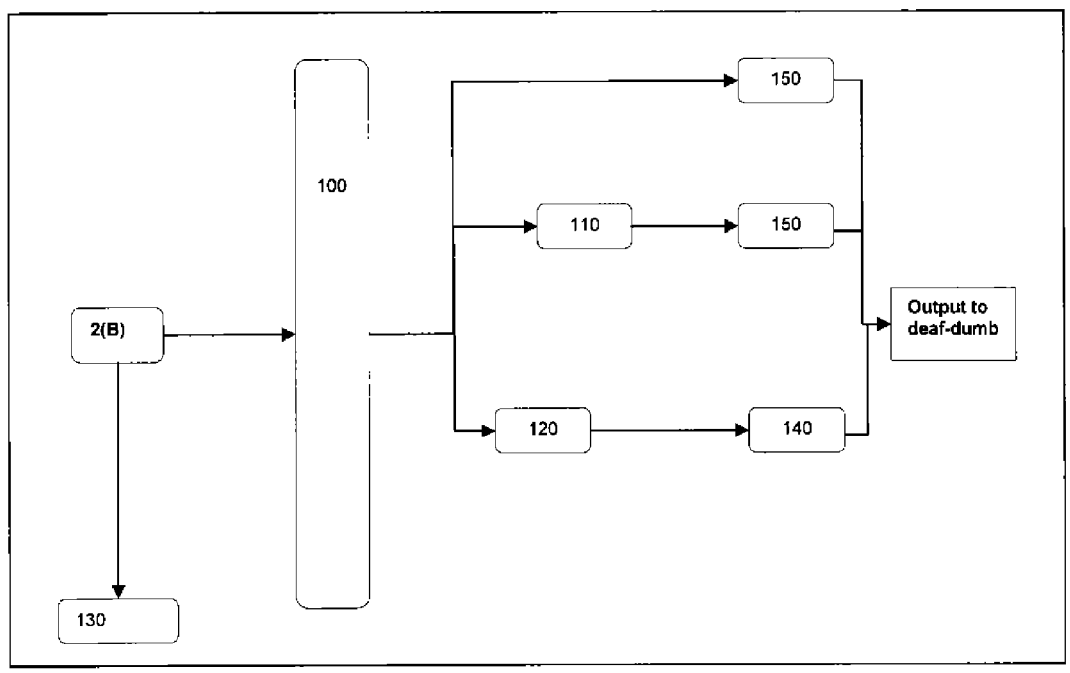
FIG. 2 illustrates the output generation framework at the receivers' end and an associated input data flow through various conversion components for synthesis of the transmitted signals received from the senders' terminal.

FIG. 2 of the present invention illustrates the functionalities required to be integrated on the communication means of the individual with disability to receive the communication over phone call or face to face from other individual according to one of the embodiment of the invention.

The regular speech output received on communication means of the individual with disability is converted to text using an inbuilt Automated Speech Recognition engine (ASR) (100).

One of the embodiments of the present invention provides inbuilt facial expression and sign synthesis engine (110) in the communication means for individuals with hearing and read-write difficulties, which converts the text synthesized by the ASR (100) to images of facial expressions and signs. These images may be animated and represents the associated meaning of the words from the image library in the form of one or more images retrieved there from.

The text output received from the ASR (100) and the facial expressions and signs output provided by the facial expression and sign synthesis engine is displayed as output on the display means of the communication aid (150) of the remote communication means.

Another embodiment of the present invention provides a text to Braille interface (120), which converts the text output of ASR (100) to Braille codes. These Braille codes output is then displayed on the Braille display (140) interfaced to the communication means.

One of the embodiments of the present invention transmits the regular speech output through usual voice call for normal individuals via speaker (130).

Figure 3:
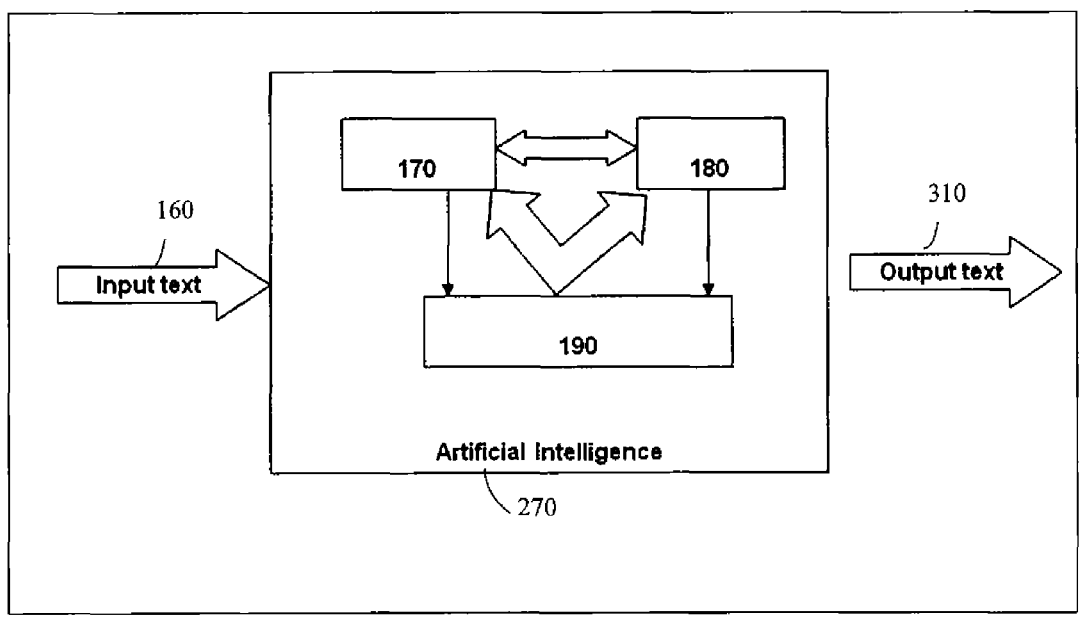
FIG. 3 illustrates the framework for implementation of an Artificial Intelligence (AI), particularly an input data flow through the various conversion components in collaboration with the artificial intelligence module for quick synthesis of meaningful sentences from discrete input text data.

FIG. 3 illustrates the framework for Artificial Intelligence (AI), particularly an input data flow through the various conversion components for synthesis of meaningful sentences from discrete input text data.

One of the embodiments of the present invention provides input means for the said communication means which comprises of keypad (10), stylus, touch screen (30) and Braille keyboard (40); wherein the user provides input text (160) in the form of text, hand written text or Braille codes to the remote communication means.

The input text (160) provided to the communication aid of the present invention is sent o the Artificial Intelligence (AI) (270). The received input text (160) at the AI (270) is converted using Natural Language Processing Engine (NLP) (170) and data mining techniques (180) to synthesize meaningful sentences as output text (310). The NLP and data mining techniques assists in fast keying of the words by the disabled individual and converts and synthesizes the meaningful sentences from the input text data (160) by comparing the input text (160) with the call history, common conversations and common words used by the user stored in the database (190).

Figure 4:
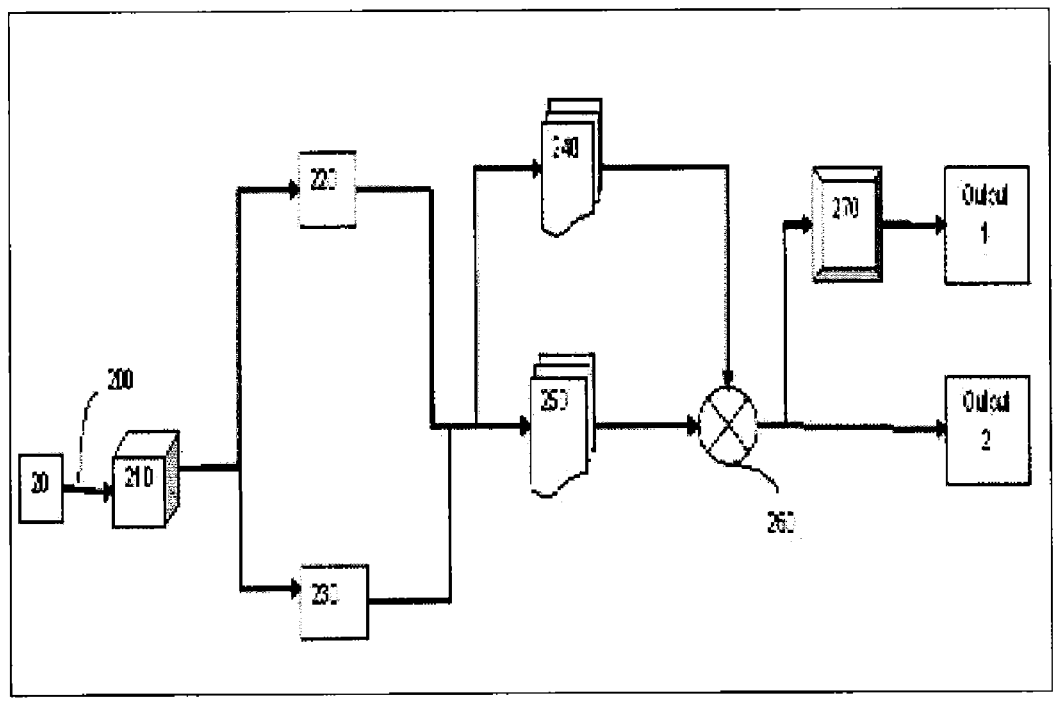
FIG. 4 illustrates an image processing methodology and associated component, the figure particularly illustrates the collaboration of artificial intelligence module with the image processing components for quick synthesis of meaningful sentences from the discrete video input.

FIG. 4 illustrates the working of image processing engine in conjunction with AI. One of the embodiments of the present invention provides input means for the said communication means comprises of camera (20). The input data (200) comprises of signs, facial expressions, images, videos captured by the camera (20) or already stored in the database (190).

The image processing engine (210) receives the input data (200) from the input means i.e. camera (20) and extracts the meaningful data from the discrete input data. The image processing engine (210) categorizes the extracted data as feature extraction data (220) and action extraction data (230).

According to one of the embodiment of the present invention, the feature extraction data (220) comprises of images and pictures representing the various signs; whereas the action extraction data (230) comprises of videos or sign language or facial expression.

The extracted data (250) is compared to that of data table (240) which comprises of the pre-stored data or the pre-recorded data in the database using the comparator (260). The extracted and compared data can be either given as output 2 or further sent to the AI (270) for fast keying, improving the accuracy of sign recognition and image processing and synthesis of meaningful sentences from discrete input data (200) as output data 1.

Figure 5:
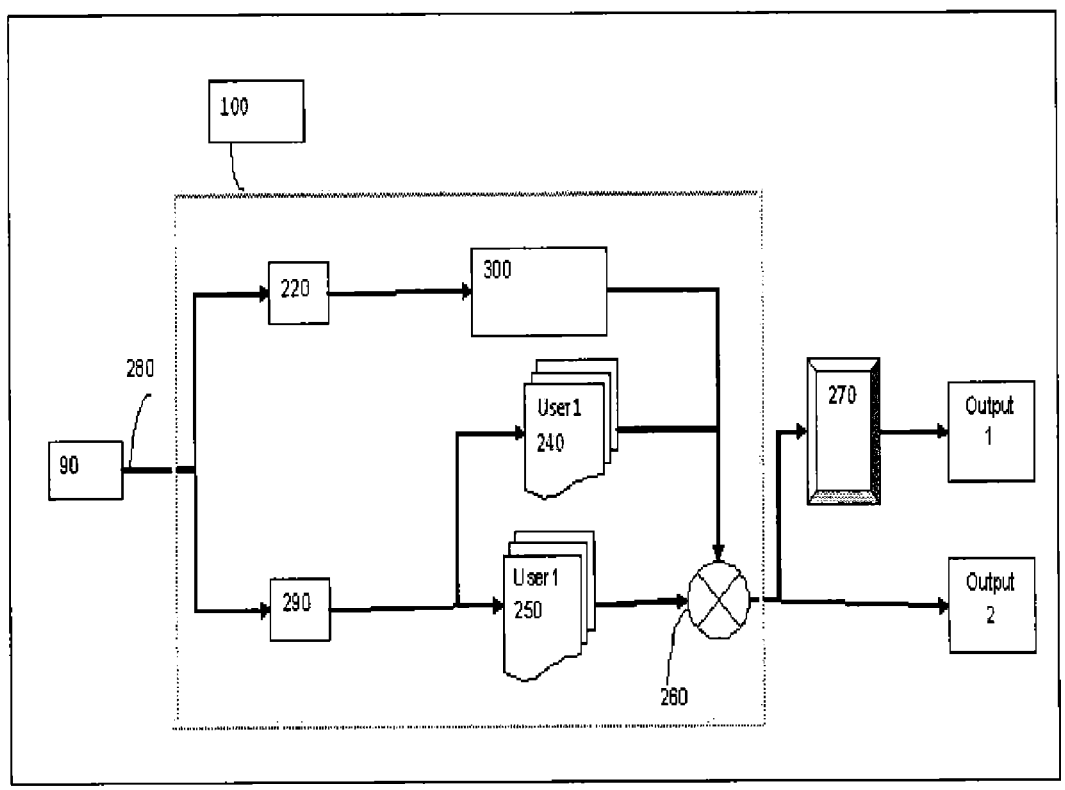
FIG. 5 illustrates an audio processing methodology and associated component, the figure particularly illustrates the collaboration of artificial intelligence module with the audio processing components for quick synthesis of meaningful sentences from the discrete audio input.

FIG. 5 illustrates the working of voice processing engine in conjunction with AI One of the embodiments of the present invention provides input means for the said communication means comprises of microphone (90). The voice input data (280) comprises of voice or tone input received by the microphone (90) or already stored in the database (190).

The automated speech recognition engine (ASR) (100) receives the voice input data (280) from the input means i.e. microphone (90) and extracts the meaningful data from the discrete input data. The ASR (100) categorizes the extracted data as feature extraction data (220) and voice extraction data (290). The data extracted from feature extraction data (220) is then determined and categorized based on the pre-stored or pre-recorded data stored in the database using Feature determination (300).

According to one of the embodiment of the present invention, the feature extraction data (220) comprises of data which determines whether the user is talking, singing, laughing, crying or screaming; whereas the tone extraction data (290) extracts and determines the lexical construction and accent of the voice for a particular user and determines the tone and voice for the particular user by comparing the pre-stored data or pre-recorded or pre-trained data in the database of ASR (100). The feature extracted data (220) and the tone extracted data (290) are compared using the comparator (260) and sent as output 2 or further the compared and extracted data can be further sent to AI (270) for fast keying, improving the accuracy of sign recognition and image processing and synthesis of meaningful sentences from discrete voice input data (280) as output data 1.

Figure 6:
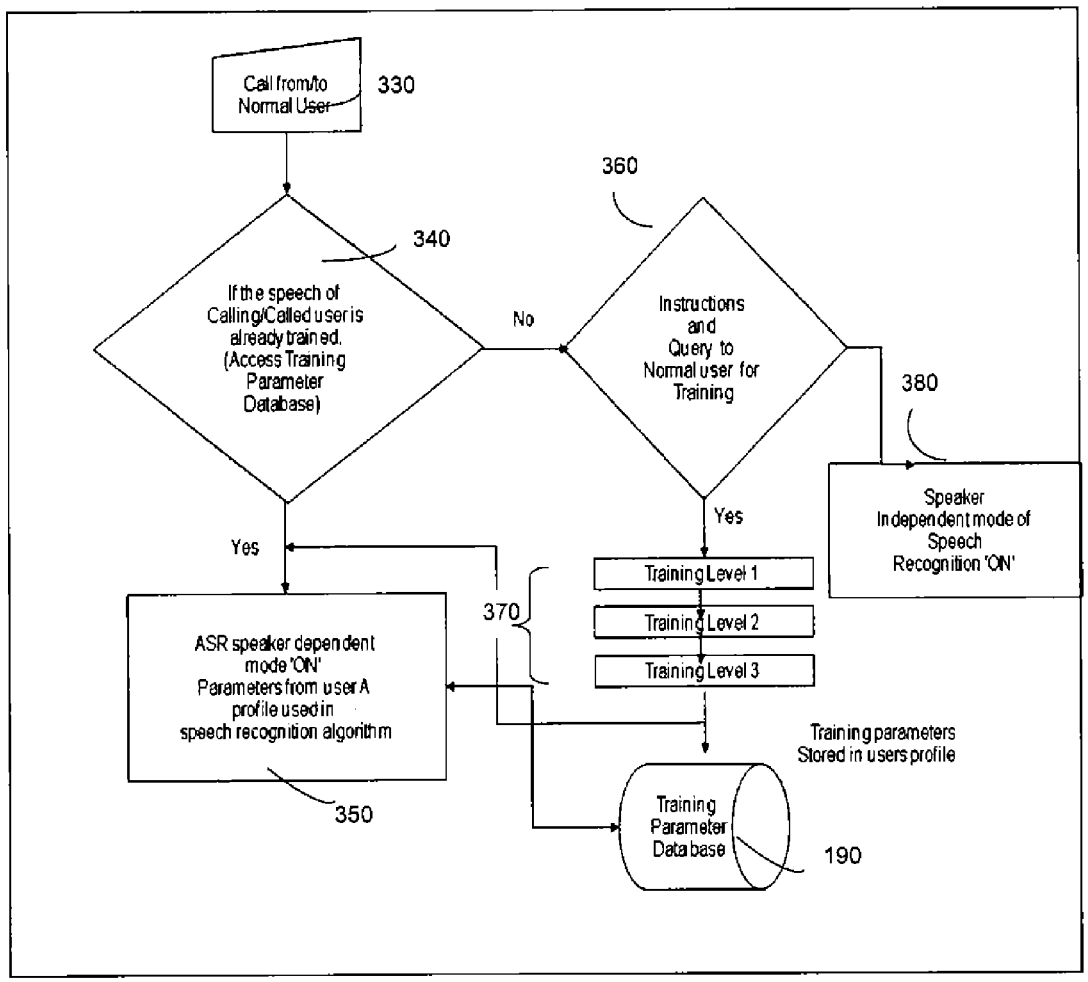
FIG. 6 illustrates a flow chart for training the speech recognition algorithm at a communication aid of the deaf-dumb individual for a normal user.

FIG. 6 illustrates the flow chart for training the speech recognition algorithm at the communication aid of the deaf-dumb individual for a normal user.

According to one of the embodiments of the present invention, when the normal user calls (330) the disabled individual, the automated speech recognition engine determines whether the speech of the caller is stored in the database on training (340). If the speech of the caller is already trained then, the ASR speaker dependent mode is switched "ON" and the parameters for the normal user is determined from the user profile stored in the speech recognition algorithm (350). The speech input received from the normal caller is then compared to that of the extracted, pre-trained data stored in the database (190).

If the speech of the caller is not trained then, the ASR speaker independent mode is switched "ON" (380) and the parameters and user profile for the normal user is created speech recognition algorithm (350) by training the speech recognition algorithm by providing the instructions and queries to normal user for training the ASR for the normal user (360). The speech input received from the normal caller is then trained at various levels (370) and extracted and stored as pre-trained data in the database (190). Once, the speech algorithm is trained for a normal user, the next time the same normal user calls, the Speech recognition algorithm would determine the speech of the user and turn the ASR dependent speech mode "ON".

Figure 7:
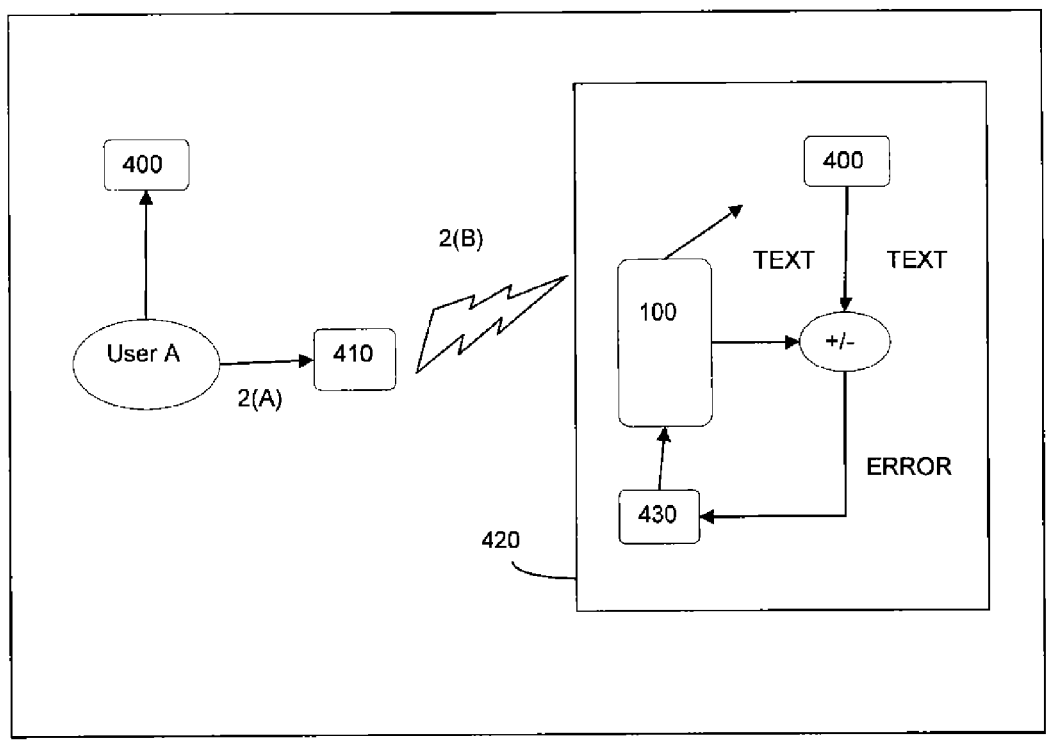
FIG. 7 illustrates ASR training framework on communication equipment for speech formalization and adaption at the senders' terminal.

FIG. 7 illustrates ASR training framework on communication equipment for speech formalization and adaption at the senders' terminal.

One of the embodiments of the present invention provides a training framework for ASR (100). The ASR (100) is trained with the speakers voice from a voice call. A training document (400) is shared with the "user A", which can be transmitted via multiple short messages, or by email or by GPRS support or by any other existing communication medium.

User A reads the training document (400) word by word while on call with first communication means (410) to provide the training speech to the ASR (100) of second communication means (420).

The ASR (100) training framework on second communication means (420) enhances the accuracy of speech recognition at the second communication means (420), when the speech for a voice call is received from first communication means (410) at remote location.

After the training procedure is complete with similar different levels of documents and with resulting error in the acceptable range, the training module can be bypassed and ASR can work more accurately for User A. In the training process an adaptive algorithm (430) checks the error and thus perfecting the ASR conversion. Similar training procedure can be performed for different users if required.

This speaker dependent ASR could be further used to communicate output (voice from other user) of mobile phone to individuals with disability as shown in FIG. 7.

Further, training procedure for ASR training framework as shown in FIG. 7 can be used to train the speech of user at remote location by providing training samples in speech form through the reverse communication channel in the same voice call in which that user's speech is to be trained.

BEST MODE/EXAMPLE OF WORKING OF THE INVENTION

The invention is described in the example given below which is provided only to illustrate the invention and therefore should not be construed to limit the scope of the invention.

Figure 8:
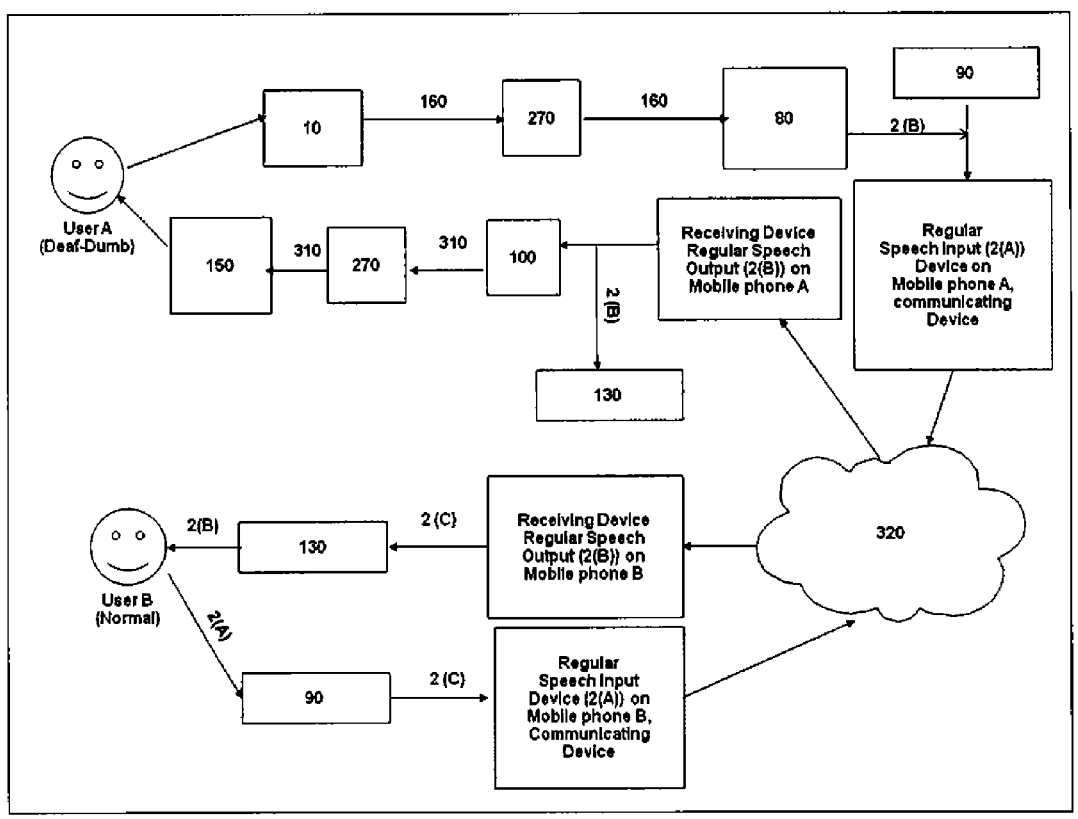
FIG. 8 illustrates the communication mode between the deaf-dumb individual and the normal individual using the hand-held communication aid of the present invention.

FIG. 8 illustrates the communication mode between the deaf-dumb individual and the normal individual using the hand-held communication aid of the present invention.

According to one of the embodiments of the present invention, the deaf-dumb individual (user A) inputs the text data (160) using the input means such as keypad (10). The input text (160) is then transmitted to the AI (270) to synthesize the meaningful sentences using the given discrete input text (160).

Further the synthesized meaningful input text (160) from the AI (270) is then further sent to the TTS (80) for converting the input text (160) to synthesized speech output [2(B)]. The synthesized speech output [2(B)] is sent to the normal user using microphone (90) of the communication aid (mobile phone A) of the user A.

The speech output is transmitted as regular speech input [2(A)] to the mobile phone B of the normal user (USER B) by the Telecom Service Provider (320).

The receiver device receives the synthesized speech output [2(B)] on mobile phone B and transmits the speech signal [2(c)] to the User B through the speaker of the mobile phone B to the user B.

The user B i.e. normal user recites the speech i.e. speech input [2(A)] through the microphone (90) of the mobile phone B. The speech signal [2(c)] is transmitted to the TSP (320), which further transmits the speech signal to the receiver device on mobile phone A of the user A i.e. deaf-dumb individual. The speech signal may be communicated directly through the speaker (130) as speech output [2(B)] or it may be further transmitted to the ASR (100), which recognizes the speech of the user using the speech recognition algorithm and further converts the speech input [2(A)] the text output data (310) in conjunction with AI (270) to enhance the accuracy of the speech recognition algorithm and enhance the accuracy of the conversion of the speech to text.

The text output data (310) is then communicated to the user A i.e. deaf-dumb individual by displaying means (150) of the communication aid (mobile phone A).

Figure 9:
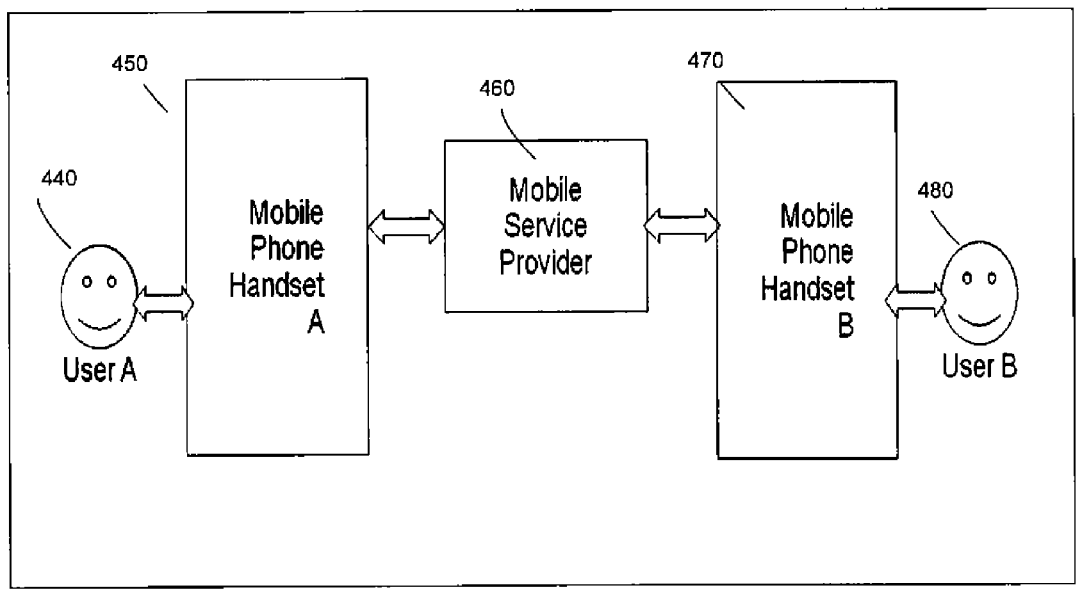
FIG. 9 illustrates communication between two users using individual hand-held communication aid of the present invention.

FIG. 9 illustrates communication between two users using individual hand-held communication aid according to one of the embodiments of the present invention.

One of the embodiments of the present invention discloses that the user A (440) and user B (480) may be a normal individual, deaf-dumb individual, deaf-dumb and blind individual or a blind individual.

Further according to one of the embodiments, user A can communicate over the network provided by telecom service provider (460) with user B using the individual communication aid. As exemplified in FIG. 9 mobile phone A (450) is used by user A (440) and mobile phone B (470) is used by user B (480) to communicate with each other over the network.

Figure 10:
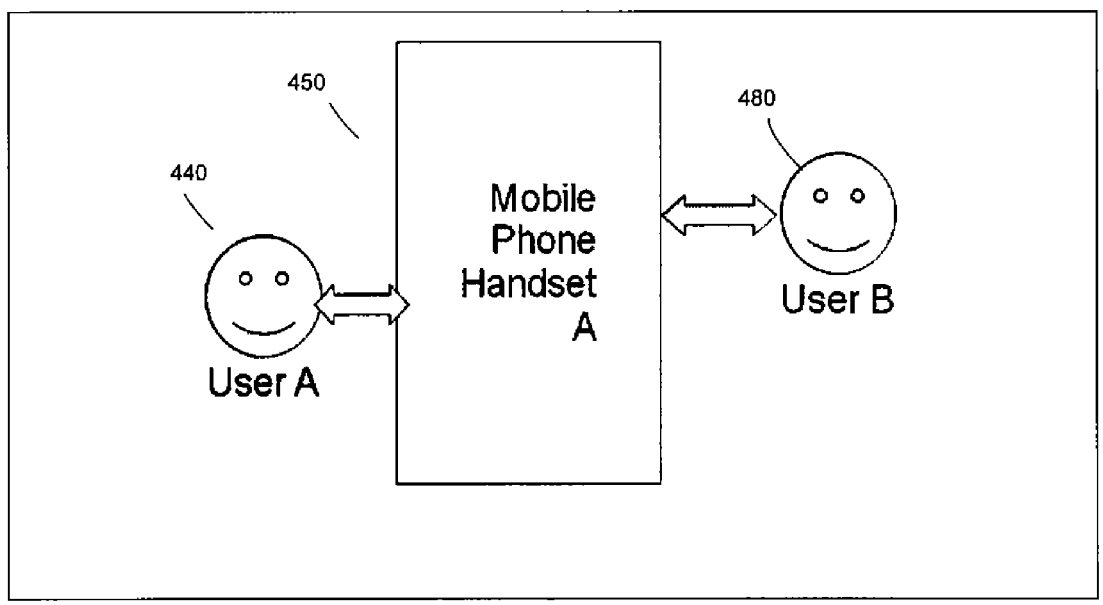
FIG. 10 illustrates communication between two users over one common hand-held communication aid of the present invention.

FIG. 10 illustrates communication between two users over one common hand-held communication aid according to one of the embodiments of the present invention.

One of the embodiments of the present invention discloses that the user A (440) and user B (480) may be a normal individual, deaf-dumb individual, deaf-dumb and blind individual or a blind individual.

Table 1 below provides the various modes of input and output for the hand-held communication aid used by user A and user B to communicate with each other, wherein user A may be a deaf-dumb individual and user B may be either a normal individual or a blind individual.

TABLE 1

| Mode (Input-Output) | USER A (Deaf-Dumb) | | | | User B (Normal or only Blind) | | | |
|---|---|---|---|---|---|---|---|---|
| | Input | Output | Hardware Modification | Software modification | Input | Output | Hardware Modification | Software modification |
| Text-Text | Keypad-Text-Typing | Display-Text-Reading | No Modification. Keypad, or Camera, or touch screen for Input and Display for output | i/p: AI, TTS o/p: ASR, Al | Microphone | Speaker | No Change | No Change |
| Text-Sign | | | | o/p: ASR, Al, expression & Sign Synthesis | Microphone | Speaker | No Change | No Change |
| | | Display-Synthesized signs-Visual | | | Microphone | Speaker | No Change | No Change |
| Sign-Text | Camera - Facial Expressions and Signs | Display-Text-Reading | No Modificaton. Keypad, or Camera, or touch screen for Input and Display for output | i/p: expression and sign recognition. Al, TTS. | Microphone | Speaker | No Change | No Change |
| Sign-Sign | | | | o/p: ASR, Al | Microphone | Speaker | No Change | No Change |
| | | Display-Synthesized signs-Visual | | o/p: ASR, Al, expression & Sign Synthesis | Microphone | Speaker | No Change | No Change |
| Write-Text | Touch Screen-Handwriting, Drawing | Display-Text-Reading | No Modification. Keypad, or Camera, or touch screen for Input and Display for output | i/p: handwriting and drawing recognition, Al, TTS. | Microphone | Speaker | No Change | No Change |
| Write-Sign | | | | o/p: ASR, Al | Microphone | Speaker | No Change | No Change |
| | | Display-Synthesized signs-Visual | | o/p: ASR, Al, expression & Sign Synthesis | Microphone | Seaker | No Change | No Change |

Table 2 below provides the various modes of input and output for the hand-held communication aid used by user A and user B to communicate with each other, wherein user A may be a deaf-dumb and blind individual and user B may be either a normal individual or a blind individual.

TABLE 2

| Mode | USER A (Deaf-Dumb and Blind) | | | | User B (Normal or only Blind) | | | |
|---|---|---|---|---|---|---|---|---|
| (Input-Output) | Input | Output | Hardware Modification | Software modification | Input | Output | Hardware Modification | Software modification |
| Braille-Braille | Braille-Braille Code-Touch | Braille Display-Touch-Reading | Braille keypad and Braille display to be integrated with handset | i/p: Braille codes recognition, AI, TTS. | Microphone | Speaker | No Change | No Change |
| | | | | o/p: ASR, AI, Text to Braille conversion. | Microphone | Speaker | No Change | No Change |

Table 3 below provides the various modes of input and output for the hand-held communication aid used by user A and user B to communicate with each other, wherein both user A and user B are deaf-dumb individuals.

TABLE 3

| Mode | USER A (Deaf-Dumb) | | | | User B (Deaf-Dumb) | | | |
|---|---|---|---|---|---|---|---|---|
| (Input-Output) | Input | Output | Hardware Modification | Software modification | Input | Output | Hardware Modification | Software modification |
| Text-Text Text-Sign | Keypad-Text-Typing | Display-Text-Reading Display-Synthesized signs-Visual | No Modification. Keypad, or Camera, or touch screen for Input and Display for output | i/p: AI, TTS o/p: ASR, AI o/p: ASR, AI, expression & Sign Synthesis | Keypad-Text-Typing | Display-Text-Reading Display-Synthesized signs-Visual | No Modification. Keypad, or Camera, or touch screen for Input and Display for output | i/p: AI, TTS o/p: ASR, AI o/p: ASR, AI, expression & Sign Synthesis |
| Sign-Text Sign-Sign | Camera - Facial Expressions and Signs | Display-Text-Reading Display-Synthesized signs-Visual | No Modification Keypad, or Camera, or touch screen for Input and Display for output | i/p: expression and sign recognition, AI, TTS o/p: ASR, AI o/p: ASR, AI, expression & Sign Synthesis | Camera - Facial Expressions and Signs | Display-Text-Reading Display-Synthesized signs-Visual | No Modification Keypad, or Camera, or touch screen for Input and Display for output | i/p: expression and sign recognition, AI, TTS o/p: ASR, AI o/p: ASR, AI, expression & Sign Synthesis |
| Write-Text Write-Sign | Touch Screen-Handwriting. Drawing | Display-Text-Reading Display-Synthesized signs-Visual | No Modification. Keypad, or Camera, or touch screen for Input and Display for output | i/p: handwriting and drawing recognition, AI, TTS. o/p: ASR, AI o/p: ASR, AI, expression & Sign Synthesis | Touch Screen-Handwriting. Drawing | Display-Text-Reading Display-Synthesized signs-Visual | No Modification. Keypad, or Camera, or touch screen for Input and Display for output | i/p: handwriting and drawing recognition, AI, TTS. o/p: ASR, AI o/p: ASR, AI, expression & Sign Synthesis |

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

ADVANTAGES OF THE INVENTION

The present invention provides hand-held communication aid for individuals with hearing and visual impairments.

Provides assistance to the deaf-dumb and visually impaired individuals to communicate in real-time with each other and with normal individuals.

Provides assistance to the deaf-dumb and visually impaired individuals to communicate face to face as well as remotely using the communication means in real-time.

Provides enhanced accuracy for sign recognition, speech recognition, handwriting and drawing recognition and Braille code recognition.

We claim:

1. A method for communication between a plurality of users, the method comprising:
   receiving a message from a first user over a first handheld communication device, wherein the message comprises at least one of an image message, a video message, a sign message, a text message, an audio message, and a Braille code, wherein the first user has one or more impairments comprising a visual impairment, a speech impairment, and an auditory impairment;
   extracting discrete data from the message by applying at least one of a feature extraction or an action extraction on the message, wherein the discrete data comprises at least one of facial expressions, emotions, video data, sign data, text data, and audio data;

generating meaningful data from the discrete data by comparing discrete data with at least one of a) pre-stored parameters or b) a first pre-defined library, wherein the pre-stored parameters are indicative of at least one of a tone of the audio of the first user and an accent of the audio of the first user, and wherein the first pre-defined library comprises images, texts, Braille codes, videos, and signs;

transmitting the meaningful data to a second user, wherein the second user has none or one or more impairments comprising a visual impairment, a speech impairment, and an auditory impairment;

receiving the meaningful data by the second user over a second handheld communication device;

converting at the second handheld communication device the meaningful data into a output data according to a profile of the second user by selecting images, texts, Braille codes, videos, audios and signs stored in a second predefined library, wherein the meaningful data is converted into output data based on the pre-trained data stored in a database associated with the second handheld communication device, wherein the pre-trained data stores training samples gathered from the first user; and providing a user interface for facilitating the second user to access the output data.

2. The method as claimed in claim 1, wherein the message from the first user is received using at least one of a keypad, a stylus, a touch screen, camera, a Braille keyboard, a microphone, a mobile phone, a personal digital assistant, a palmtop, a mobile digital assistant, and a digital wrist watch.

3. The method as claimed in claim 1, wherein the pre-stored parameters are generated using a pre-defined set of rules comprising pre-defined instructions and queries.

4. The method as claimed in claim 1, wherein the meaningful data is converted into the output data using one of a Braille to text converter, a text to Braille converter, speech to text converter and a text to image converter.

5. The method as claimed in claim 1, wherein the user interaction is achieved by at least one of a Braille display, an audio amplifier, and a display for displaying textual data.

6. A system for facilitating communication between a plurality of users, the system comprising:
a first handheld communication device and a second handheld communication device, wherein the first handheld communication device is configured to:
receive the message from a first user, wherein the message comprises at least one of an image message, a video message, a sign message, a text message, an audio message, and a Braille code, wherein the first user has one or more impairments comprising a visual impairment, a speech impairment, and an auditory impairment;
extract discrete data from the message by applying at least one of a feature extraction or an action extraction on the message, wherein the discrete data comprises at least one of facial expressions, emotions, video data, sign data, text data, and audio data;
generate meaningful data from the discrete data by comparing discrete data with at least one of a) pre-stored parameters or b) a pre-defined library, wherein the pre-stored parameters are indicative of at least one of a tone of the audio of the first user and an accent of the audio of the first user, wherein the pre-defined library comprises images, texts, Braille codes, videos, and signs; and
transmit the meaningful data to a second user over the second handheld communication device, wherein the second user has none or one or more impairments comprising a visual impairment, a speech impairment, and an auditory impairment;
and wherein the second handheld communication device configured to:
receive the meaningful data transmitted by the first handheld communication device;
convert the meaningful data into a output data according to a profile of the second user by selecting images, texts, Braille codes, videos, audios and signs stored in a second predefined library, wherein the meaningful data is converted into output data based on the pre-trained data stored in a database associated with the second handheld communication device, wherein the pre-trained data stores training samples gathered from the first user; and
provide a user interface for facilitating the second user to access the output data.

* * * * *